United States Patent [19]

Loeser et al.

[11] Patent Number: 4,473,896
[45] Date of Patent: Sep. 25, 1984

[54] TACTICAL EXPENDABLE DEVICE

[75] Inventors: Harrison T. Loeser, Waterford; Harold J. Doebler, East Lyme, both of Conn.

[73] Assignee: The United States of America as represented by the Secretary of the Navy, Washington, D.C.

[21] Appl. No.: 379,685

[22] Filed: May 19, 1982

[51] Int. Cl.³ .............................................. H04B 11/00
[52] U.S. Cl. ........................................ 367/131; 367/4; 367/130
[58] Field of Search ....................... 367/3, 4, 106, 130, 367/131, 134, 173

[56] References Cited

U.S. PATENT DOCUMENTS

| | | | |
|---|---|---|---|
| 3,944,964 | 3/1976 | Loeser et al. | 367/4 |
| 4,189,703 | 2/1980 | Bennett | 367/131 |
| 4,203,109 | 5/1980 | Ballard et al. | 367/4 |
| 4,387,450 | 6/1983 | Zachariadis | 367/130 |

*Primary Examiner*—Richard A. Farley
*Attorney, Agent, or Firm*—Robert F. Beers; Arthur A. McGill; Michael J. McGowan

[57] ABSTRACT

A Tactical Expendable Device (TED) adapted to be ejected into the water from a variety of launch platforms and to achieve and remain substantially stationary at a predetermined operating depth for a predetermined time interval or to sink at a predetermined rate for sensing acoustic signals and transmitting such signals to the launch platform through a long, small diameter connecting cable such as a fiber optic filament. The TED system comprises the TED cannister, a long connecting cable, deployment means on the launch platform including a launch tube with integral dereeler, a buffer and onboard signal processing/display equipment. The TED cannister further comprises a sensing element, a buffer, a power source and a dereeling device.

10 Claims, 6 Drawing Figures

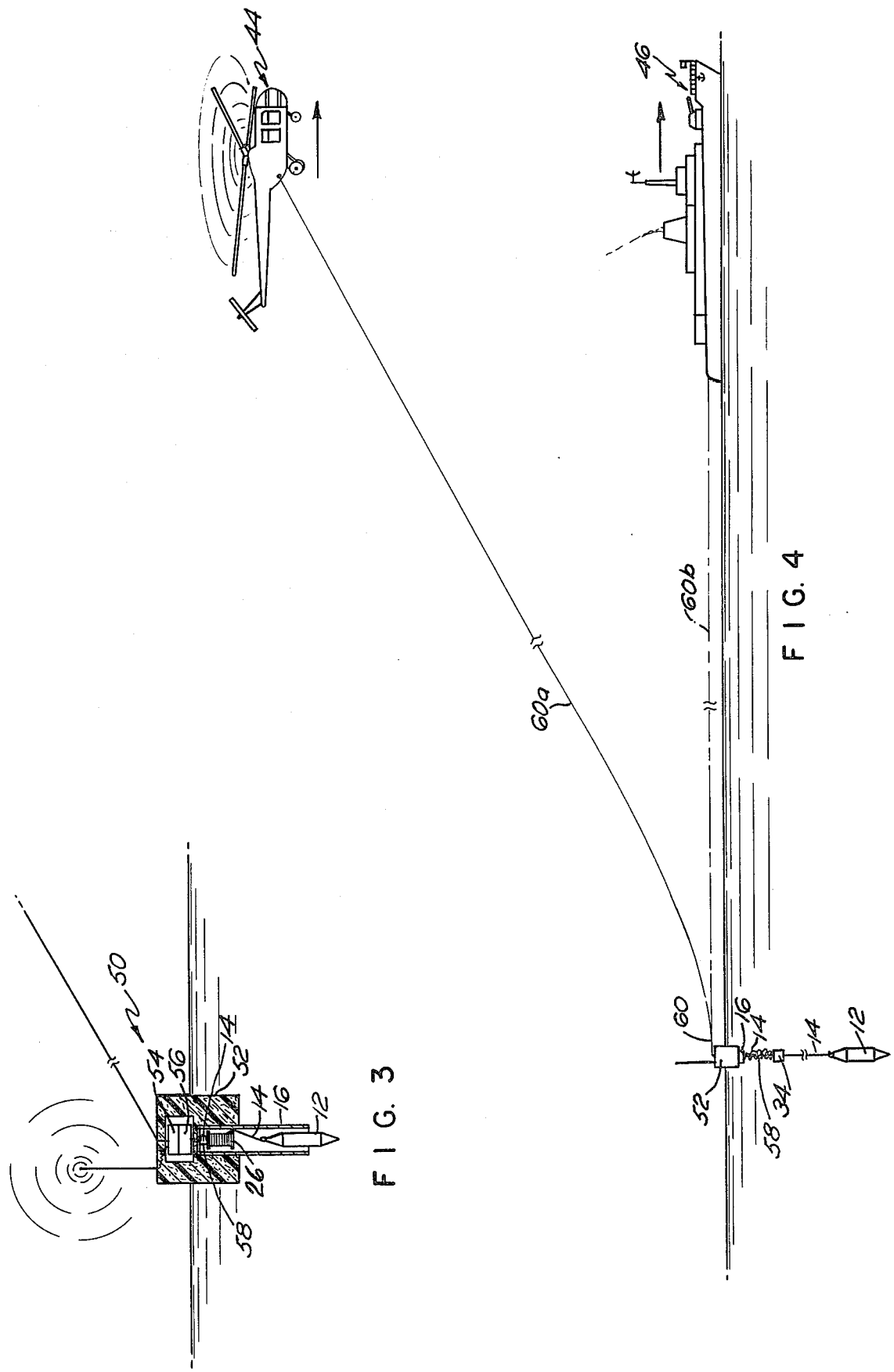

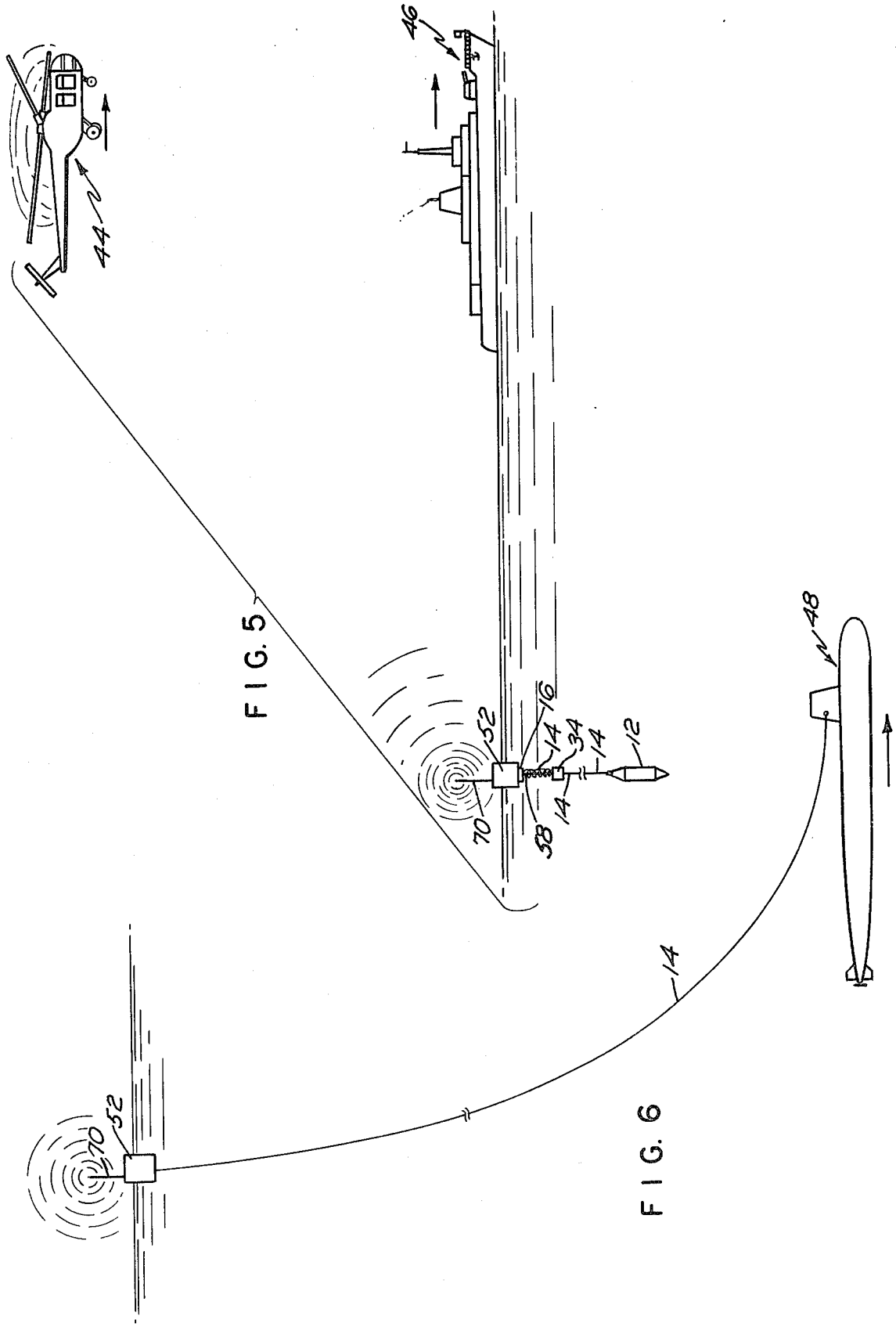

TACTICAL EXPENDABLE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to underwater detection of own platform or other than own platform acoustic signals and more particularly to a Tactical Expendable Device (TED) for use by submarines, surface ships and helicopters for short range target detection under ambient noise conditions, RF communications or monitoring of own platform noise.

(2) Description of the Prior Art

It is well known that the normal method of acoustic detection for submarines, surface ships or helicopters is a general purpose active or passive sonar system including hydrophone elements, cabinets of electronic circuitry and one or more displays manned by full-time sonar operators. These sonar systems, which include hull mounted, suspended and towed arrays, acquire detection at the greatest possible range consistent with ships self noise, e.g., flow noise, propeller noise, machinery noise, etc., environmental conditions and propagation paths existing at that time and place. Suspended and towed arrays however are not carried by all ASW platforms and even when carried, cannot always be conveniently deployed in every situation. In addition, all of these types of sonar systems have operational limitations.

Flow noise and own platform propulsion noise unavoidably increase with platform speed, thus degrading sonar performance. At the highest platform speeds, high noise levels eliminate much or all of the directivity gains achieved by using a multielement array over a single hydrophone in an ambient noise background. Also, improved performance of sonar systems tends to be directly correlated to increased physical size and consequently to increase weight. Thus, there are upper limits in performance and detection range which can be provided to an ASW platform by a general purpose system. In addition, an array necessarily has some acoustic distortion or blind spots because of array location, design or nature of the dome, presence of other structures around it, and the need to baffle it from propulsion machinery or noise sources aboard the platform. For example, hull mounted arrays are generally blind to stern arrivals while the performance of towed arrays is degraded by own platform noise. Furthermore, no existing arrays can monitor own platform noise or active sonar systems in the far field.

The TED not only supplements these systems by providing additional capability where these systems have limitations but also provides new capabilities.

SUMMARY OF THE INVENTION

Accordingly, it is a general purpose and object of the present invention to provide a device for use in a plurality of Navy tactical situations. It is a further object that such device be inexpensive and hence expendable. A still further object is that such device be deployable by submarine, surface ship and helicopter. Still another object is that such device be adaptable for use in RF communications. Still another object is that the device remain essentially stationary in the water or move slowly at a predetermined rate in order to eliminate the effects of flow noise.

These and other objects of the present invention will become apparent when considered in conjunction with the specification and drawings.

These objects are accomplished with the present invention by providing a TED, designed to be ejected into the water and to remain relatively stationary at operating depth or slowly sink at a predetermined rate for a period of time in order to provide separation from own platform and flow induced noise while sending signals back to the launch platform via a long, thin connecting cable thus significantly improving acoustic detection probability over that provided by existing sonar systems for specific classes of Naval tactical situations. The TED is an inexpensive and thus expendable detection device. A TED system comprises a sensing element, a buffer, a power source, a dereeler, a long fine wire/filament connection to a launch tube aboard a launching platform and onboard processing/display equipment. In use the TED provides high capability because; it operates with a fully alerted operator, it may be deployed close to a suspected target, it operates in a low noise background approaching ambient levels and it is an omnidirectional broadband receiver. This device has several tactical applications and possible device configurations based on one common principle; short range target detection under ambient noise conditions. It may also be used by submarines for RF communications with and/or monitoring of transmitters above the water surface.

BRIEF DESCRIPTION OF THE DRAWINGS

FIG. 3 shows a surface drop configuration TED.

FIG. 4 shows the TED configuration of FIG. 3 being deployed by a helicopter and a surface ship using an in-air dereeling communication link.

FIG. 5 shows an alternate RF mode of communication between the TED of FIG. 4 and the deploying surface ship or helicopter.

FIG. 6 shows the flotation collar/antenna portion similar to a surface drop TED launcher being used by a submarine as an RF monitor or communication link with the surface.

DESCRIPTION OF THE PREFERRED EMBODIMENTS

The Tactical Expendable Device is ejected into the water and quietly drifts at operating depth for a period of time or sinks at a predetermined rate while sending signals back to the launch platform. This invention improves acoustic detection probability over that of existing systems in a specific class of tactical situations and may be used by submarines, surface ships and helicopters. The concept employs an inexpensive (thus expendable) detection device in such a way that a target is easier to detect than own platform noises. The device has several configurations based on one common principle; short range target detection under ambient noise conditions.

The TED is a system concept comprising a selectively ballasted cannister containing one or more sensing elements and associated electronics connected to the launch platform by a fine filament, such as glass fiber or thin wire. Both the launch platform and the TED contain a long spool of fine filament which can be uncoiled with a very weak pull. As the TED moves at its predetermined rate through the water, filament from its cannister is effortlessly payed out. As the launch platform moves away from the launching site, the filament is payed out from its cannister. Line loss varies depending on type of filament used and may be less than 10 dB per km. Characteristics are built into the signal processing electronics to compensate for the line losses. The filament will be connected into existing processing equipment such as the BQR-20 analyzer, for example.

The TED cannister will be selectively ballasted to achieve either near neutral buoyancy or a preselected rate of sink depending on the tactical configuration desired. In either case, velocity of the TED through the water will be slow enough to assure the elimination of signal contamination by TED flow noise.

Figure 1:
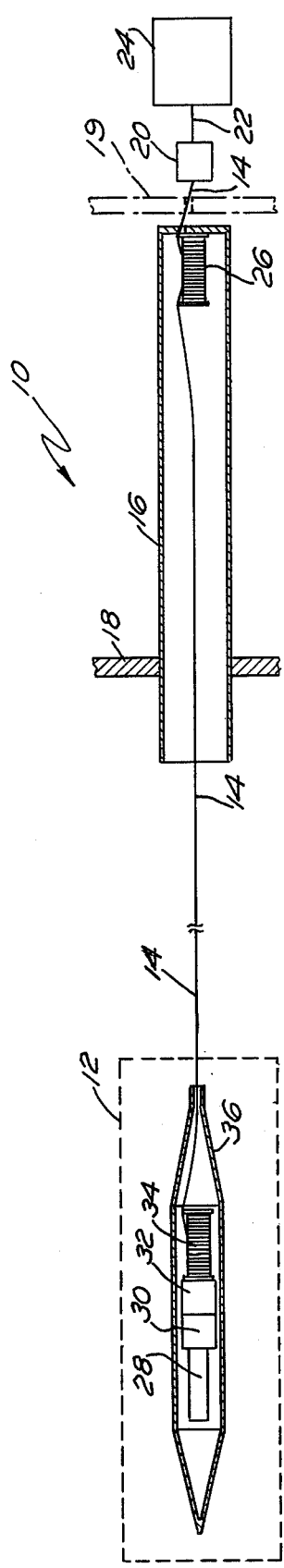
FIG. 1 shows a TED system built according to the teachings of subject invention.

Referring now to FIG. 1 there is shown a Tactical Expendable Device (TED) system 10 which further comprises a TED 12, a long, small diameter connecting cable 14, a launch tube 16 mounted so as to either pass through the platform outer skin 18 or be located outside the platform outer skin such as 19, an onboard buffer 20, and a cable 22 connecting buffer 20 to a receiver 24. One end of cable 14 is payed out from a cable dereeler 26, mounted within launch tube 16. TED 12 further comprises a sensor 28 which may be a hydrophone or the like, a battery 30, a buffer 32 and a second cable dereeler 34 housed within cannister 36 which pays out the other end of cable 14. Cable 14 thus runs from buffer 32 in cannister 36, around dereeler 34 and from there to and around dereeler 26 in launch tube 16 to onboard buffer 20 where signals from TED 12 are transduced before being transmitted by cable 22 to receiver 24. Cable 14 may be either a fiber optic filament or a fine wire depending on desired TED performance and deployment time. When cable 14 reaches the end of its length it breaks thus allowing the device to be scuttled. Buffers 20 and 32 may be any device required to transduce energy from one form or state to a different form or state and may include preamps, amplifiers, electric-to-light converters or analog-to-digital devices.

Figure 2:
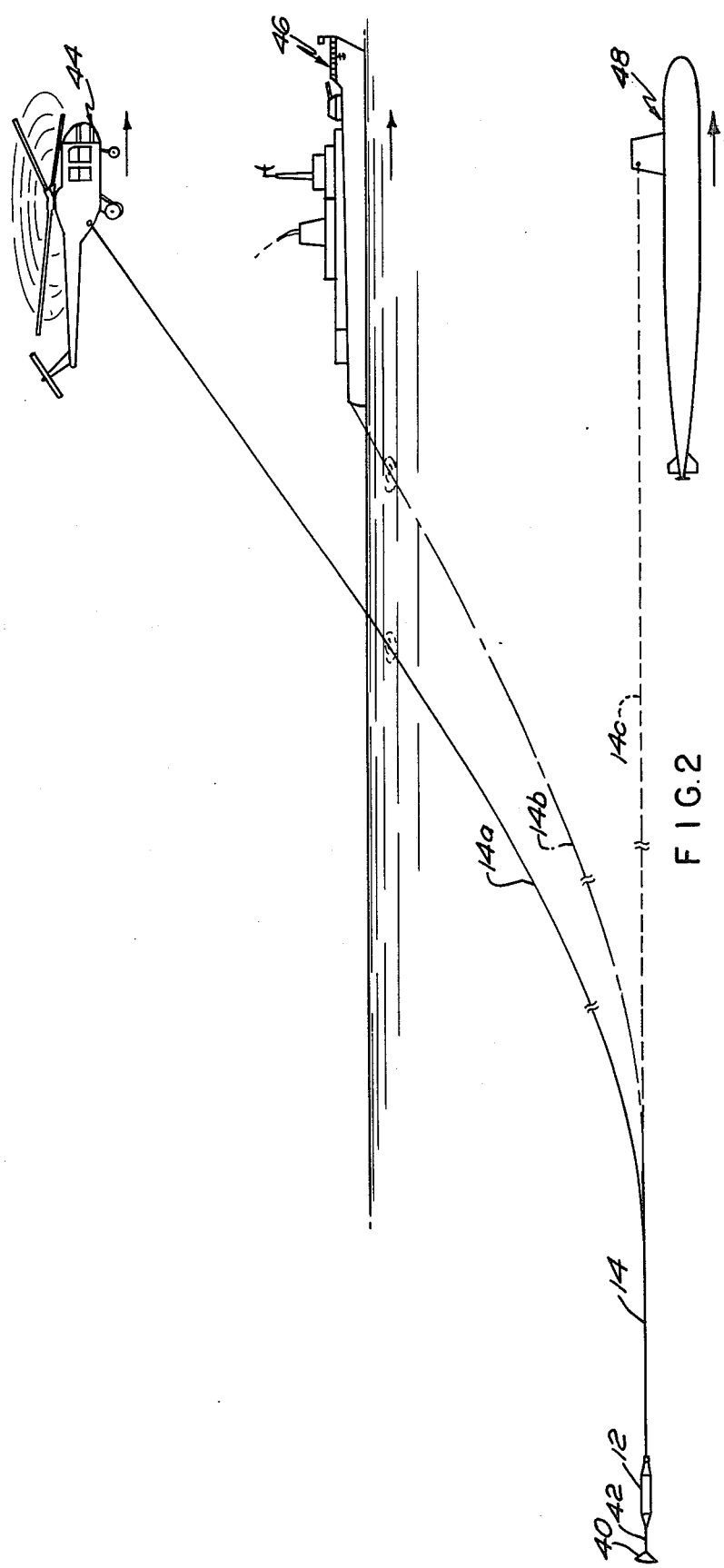
FIG. 2 shows three types of launch platforms deploying a drogue configuration TED.

FIG. 2 shows a TED 12 being operated by three different launch platforms; helicopter 44, surface ship 46 and submarine 48. Long cable 14 may connect to a helicopter 44, a surface ship 46 or a submarine 48 as shown by cable 14a, 14b or 14c respectively. For the submarine 48 deployment, TED 12 is made near neutrally buoyant to permit it to stay at essentially deployment depth. Drogue 40, attached to TED 12 by bungee cord 42 provides the drag resistance which permits cable 14 to dereel. For either helicopter 44 or surface ship 46 deployment, TED 12 is ballasted to have negative buoyancy such that together with the effects of drogue 40, the preselected motion through the water is determined causing the TED to sink at a preselected rate. As the selected launch platform moves away from the launch site, cable 14 pays out simultaneously from the dereeler in the TED and the one aboard the platform.

FIG. 3 shows a surface drop configuration of a deploying device 50 for a TED 12 comprising a launch tube vertically mounted in a flotation collar 52. Also mounted within flotation collar 52 are a transmitter/receiver 54 and a battery 56. Dereeler 26 is attached to the flotation collar 52 by a length of bungee cord 58 which has excess loops of cable 14 wrapped helically therearound such that as dereeler 34 sinks and bungee cord 58 reaches full extension no stress is placed on cable 14 while the elastic properties of the bungee cord serve to attenuate the vertical oscillations of flotation collar 52 on the surface caused by wave motion.

FIG. 4 shows the surface drop configuration of device 50 of FIG. 3 as deployed from a helicopter 44 or a surface ship 46. Flotation collar 52 is linked to the launch platform by a second long cable 60 which dereels from launch platform 44 or 46 as cable 60a or 60b, respectively. Upon water impact dereeler 26 and TED 12 start to sink at a predetermined rate based upon the ballast status of TED 12. Bungee cord 58 reaches the end of its length causing dereeler 26 to stop its decent while TED 12 continues to sink. Based upon TED buoyancy it will either break cable 14 at its extreme of dereeling or will stop sinking at desired depth. In either event a scuttling plug will sink device 50 after a preset time interval. Acoustic signals sensed by TED 12 are transmitted via cable 14 and then via cable 60 to the deploying launch platform.

FIG. 5 shows the same deployment scheme as FIG. 4 which operates in the same fashion except that second cable 60 is not used. Instead, Electro Magnetic Radiation (EMR) signals such as radio frequency (RF) from TED 12 are broadcast from flotation collar 52 by transmitter 54 through antenna 70 to either a helicopter 44 or a surface ship 46.

FIG. 6 shows submarine 48 deploying only flotation collar 52 having battery 56 and transmitter/receiver 54 for RF communication through antenna 70 with transmitters/receivers above the water surface. Cable 14 dereels as described above leaving collar 52 essentially stationary on the surface. Passive or active monitoring of signals may be had in this manner.

Four types of deployment are here presented as examples of TED use:

(a) When a submarine decides to increase acoustic surveillance in a particular region, without maneuvering or deploying a towed array, a TED can be released. The TED is launched at the desired operating depth. Filament pays out from both the ship and the sensor. Within a few seconds, the sensor decelerates, becoming nearly motionless in a horizontal plane, but very slowly sinks. The submarine continues at its desired course and speed; own platform noise falls rapidly as the distance opens. As own platform moves away, acoustic levels at the TED gradually approach ambient noise and search capability improves. A point is soon reached when a quiet submarine operating near the TED is more detectable than own platform.

(b) A surface ship or helicopter wishes to gain additional information, possibly for classification purposes on a contact held at close range. In this case, a surface-launched TED will be used. The TED is dropped on top of the known target position and set to deploy to a favorable depth or to search through depth based on considerations of sound velocity profile and suspected target operating depth. Own platform continues away from the position and then slows in order to minimize own platform noise and maximize the search and classify time provided. A real target will emit signals which can be distinguished from false contacts. Target classification clues can be gained in this way.

(c) A means for periodic in-situ monitoring of own platform detection capability and counter-detection vulnerability for submarine or surface ship is desirable. TED can provide two far field inputs: own platform radiated noise vis a vis ambient noise and active sonar source level. When it is desired to obtain this information, the surface ship or submarine deploys a TED at an appropriate depth, opens out in range, then continues in a slow turn around the TED position. Guidance can be developed specifying TED depth, distances, speed, turning rates and interpretation of resulting levels.

(d) It is desired to monitor passive own platform systems. A TED is deployed in the same fashion as (c) above but a calibrated acoustic source is used in lieu of a sensor in the TED.

What has thus been described is a TED, designed to be ejected into the water and to remain relatively stationary at operating depth or slowly sink at a predetermined rate for a period of time in order to provide separation from own platform and flow induced noise while sending signals back to the launch platform via a long, thin connecting cable thus significantly improving acoustic detection probability over that provided by existing sonar systems for specific classes of Naval tactical situations. The TED is an inexpensive and thus expendable detection device. A TED system comprises a sensing element, a buffer, a power source, a dereeler, a long fine wire/filament connection to a launch tube aboard a launching platform and onboard processing/display equipment. In use the TED provides high capability because; it operates with a fully alerted operator, it may be deployed close to a suspected target, it operates in a low noise background approaching ambient levels and it is an omnidirectional broadband receiver. This device has several tactical applications and possible device configurations based on one common principle; short range target detection under ambient noise conditions. It may also be used by submarines for RF communications with and/or monitoring of surface transmitters.

Obviously many modifications and variations of the present invention may become apparent in light of the above teachings. For example, any EMR link such as a laser may be used for communications in addition to RF signals. Sensors used in the TED, in addition to hydrophones, may include projectors, temperature probes and fiber optic sensors. Also, any other mechanical motion decoupler besides a bungee may be used to decouple surface wave motion from reaching the dereeler. Power to operate the TED may be transmitted from the launch platform in lieu of using batteries. Any of various scuttling means may also be used to sink the flotation device.

In light of the above, it is therefore understood that within the scope of the appended claims, the invention may be practiced otherwise than as specifically described.

What is claimed is:
1. A tactical device system comprising:
a launch platform;
launching means, fixedly attached to said launch platform, for storing and launching said tactical devices, said launching means further comprising a launch tube and a first dispensing means for paying out connecting cable from said launch platform mounted launch tube;
expendable means, deployably stored within said launching means, for sensing incoming acoustic signals, said expendable means further comprising sensor means adapted to receive said incoming acoustic signals for converting said acoustic signals to proportional electrical signals, buffer means for transducing said electrical signals to a different form or state, power source means for providing power to said buffer means whereby said acoustic signals are transduced and transmitted, a second dispensing means for receiving said transduced signals from said buffer means and for paying out said connecting cable carrying said transduced signals to said launch platform, and a cannister for mounting and enclosing said sensor means, said power source means, said buffer means and said dispensing means;
deploying means for deploying said expendable means from said launch platform into the water;
a first communication means for transmitting data signals between said launch platform and said expendable means; and
receiving means aboard said launch platform, for receiving said data signals from said expendable means transmitted via said first communication means.

2. A tactical device system according to claim 1 wherein said deploying means further comprises a drogue fixedly attached to said expendable means whereby suitable drag force is provided to keep said expandable means essentially stationary in the water at a preselected depth.

3. A tactical device system according to claim 1 wherein said launch platform further comprises a surface flotation device, said flotation device being deployed from a launch vehicle.

4. A tactical device system according to claim 3 wherein said flotation device further comprises:
a flotation collar having said launching means, said deploying means, said first communications means, said receiving means and said expendable means fixedly attached thereto said first dispensing means being moveably mounted to said launch tube and said expendable means by a flexible cord such that said despensing means is supported below said launch tube in such a way that said first communications means is protected from a vertical oscillations due to wave motion on said flotation collar;
a second communications means, attached to said flotation collar, for receiving and transmitting said data signals from said expendable means to said launch vehicle;
a transmitter/receiver, mounted within said flotation collar and attached to said second communications means, for transmitting and receiving said data signals; and
a battery, mounted within said flotation collar and connected to said transmitter/receiver for providing electrical power to operate said transmitter/receiver.

5. A tactical device system according to claim 2 or 4 wherein said first communications means further comprises a long, small diameter connecting cable such as a fiber optic filament.

6. A tactical device system according to claim 5 wherein said receiving means further comprises:
an onboard buffer for receiving said data signals from said first communication means and transducing said data signals to a different form or state; and a receiver for receiving said transduced data signals from said onboard buffer for further processing.

7. A tactical device system according to claim 2 wherein said launch platform is a submarine and said expendable means is made neutrally buoyant.

8. A tactical device system according to claim 2 wherein said launch platform is a surface vessel and said expendable means has relatively low positive buoyancy which, in conjunction with said drogue, operates to position said expendable means at said preselected depth.

9. A tactical device system according to claim 2 wherein said launch platform is a helicopter and said expendable means has relatively low positive buoyancy which, in conjunction with said drogue, operates to position said expendable means at said preselected depth.

10. A tactical device according to claim 4 wherein said first and second communication means further comprise long, small diameter connecting cables such as fiber optic filaments, said second connecting cable being payed out from said flotation collar and said launch vehicle as said launch vehicle moves away from the deployment site.

* * * * *